Oct. 31, 1967 L. F. LUCKENBILL 3,350,057
RETAINER RING AND THRUST WASHER ARRANGEMENT
FOR VALVES OR THE LIKE
Filed June 17, 1965 2 Sheets-Sheet 1
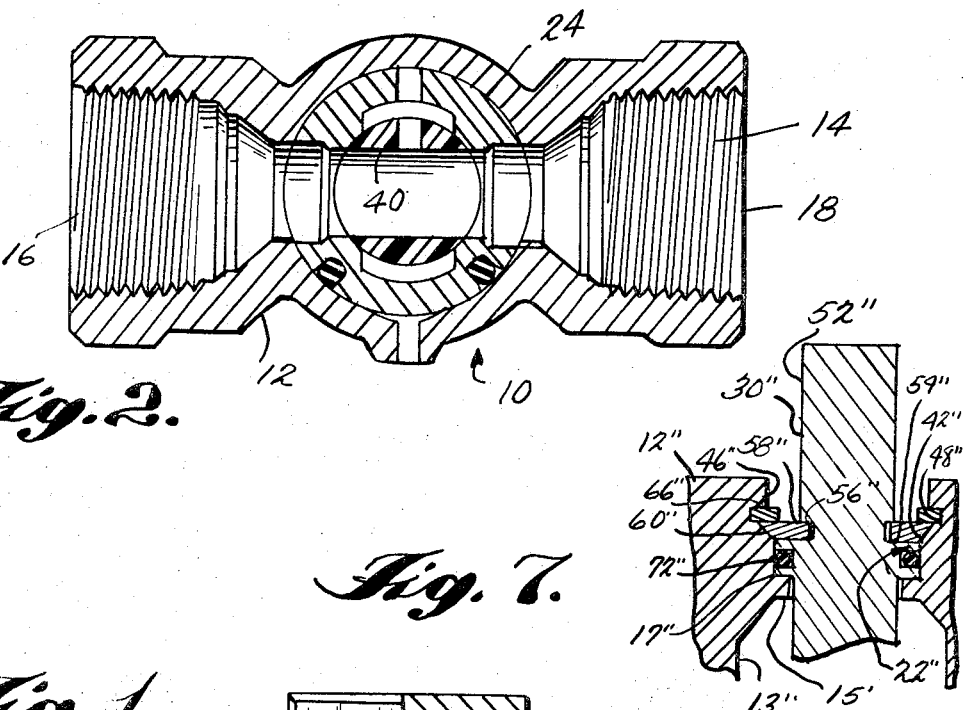
Fig. 2.
Fig. 7.
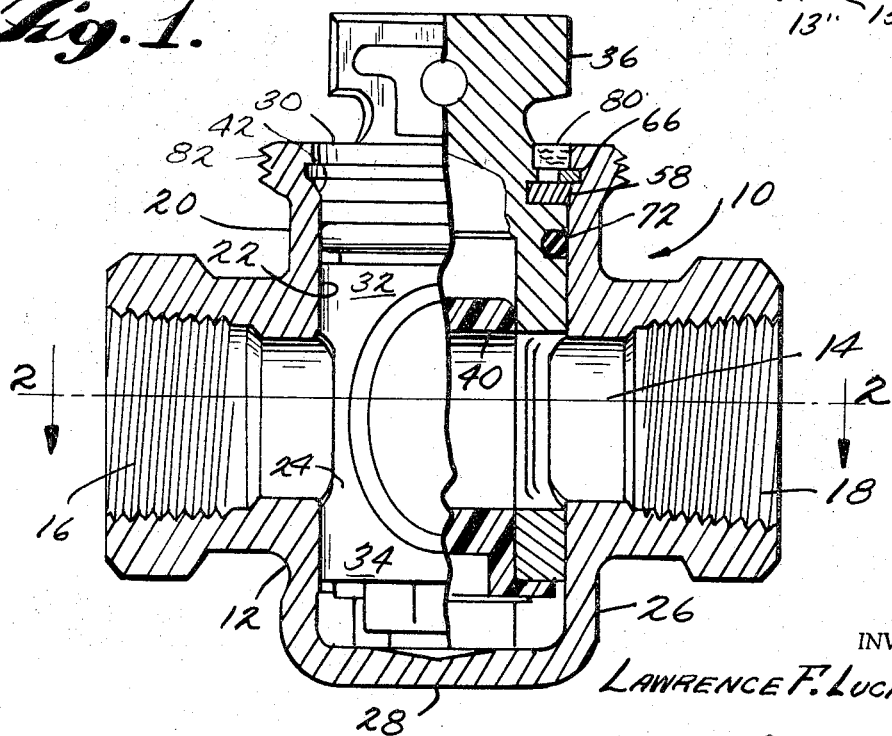
Fig. 1.
INVENTOR
LAWRENCE F. LUCKENBILL
BY Cushman, Darby & Cushman
ATTORNEYS

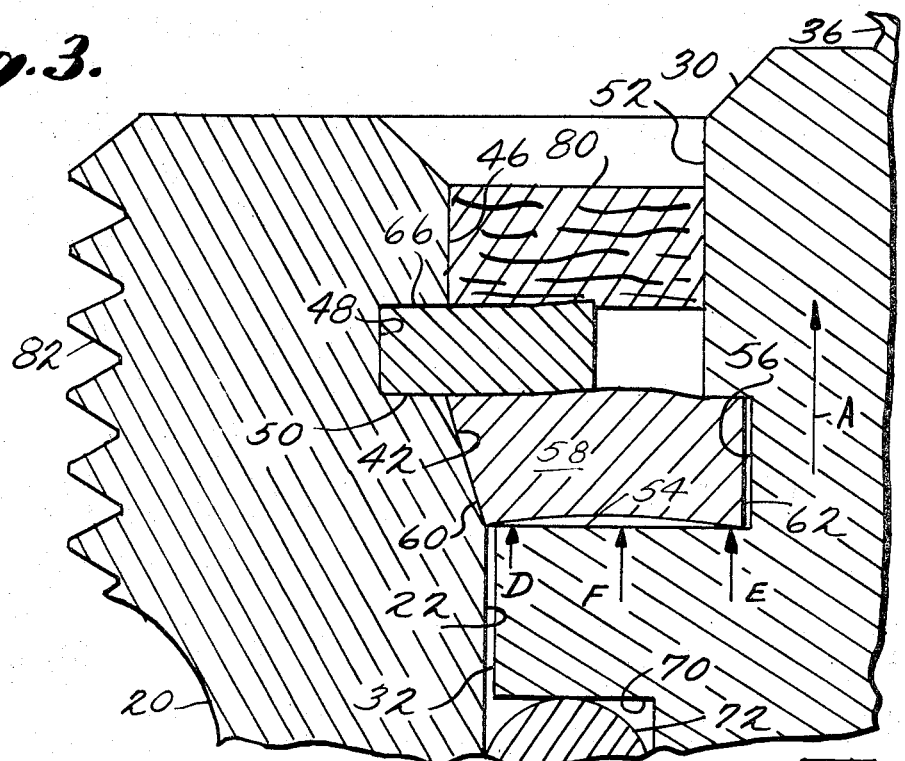
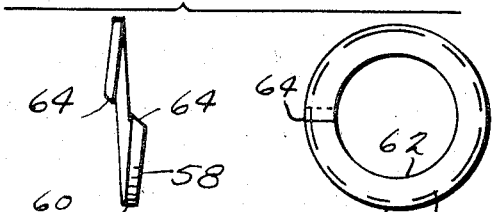
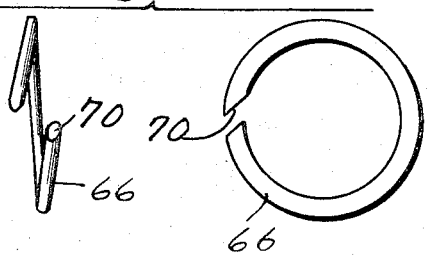
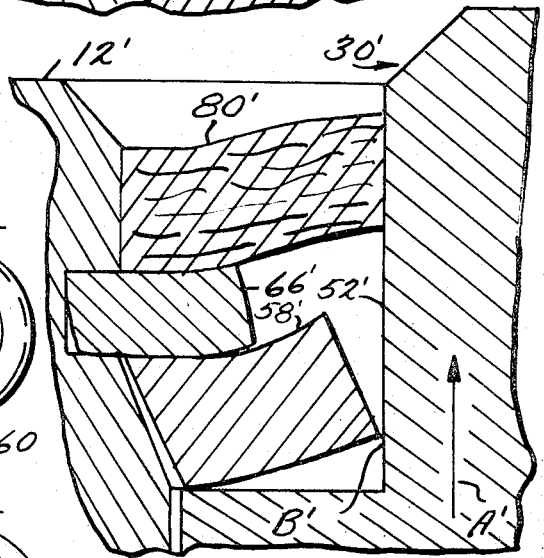
INVENTOR
LAWRENCE F. LUCKENBILL
BY
ATTORNEYS United States Patent Office 3,350,057
Patented Oct. 31, 1967

3,350,057
RETAINER RING AND THRUST WASHER AR-
RANGEMENT FOR VALVES OR THE LIKE
Lawrence F. Luckenbill, Decatur, Ill., assignor to Mueller
Co., Decatur, Ill., a corporation of Illinois
Filed June 17, 1965, Ser. No. 464,636
15 Claims. (Cl. 251—312)

The present invention relates to improvements in a packing gland arrangement for keys or stems of valve assemblies or the like and, more particularly, to an improved arrangement of retainer ring and thrust washer for valve assemblies or the like of the type having a housing with a flow passage therethrough, the housing being provided with an opening in the side of the same through which a valve key or stem member is inserted and supported therein.

While the present invention is disclosed as being incorporated on a rotary valve assembly utilizing a plug type of valve in a "closed-bottom" type housing, it will be understood that the plug valve is merely disclosed for the purpose of description, the valve also being capable of being of the "ball" type. Also, the invention may be incorporated as a packing gland application to other types of valves and fluid members, for example, to a non-rising gate valve, fire hydrant valve, check valve, or the like.

In a "closed-bottom" type of housing for a rotary valve, the housing is provided with a cylindrical extension opening to the flow passage therein through which a rotatable valve body provided on the valve key member can be inserted. Since this type of rotary valve assembly is generally an unbalanced valve, i.e., when the valve is open, the line pressure within the valve will act on the end of the valve body tending to urge the valve key member axially outwardly of the cylindrical extension of the valve housing, it is necessary to provide means to prevent axial movement of the valve key member. Heretofore, such means have merely included the use of a split type snap lock ring carried in a groove in the extension and bearing against a portion or shoulder on the valve key member. Sealing means were then provided between the key member and the cylindrical extension but oftentimes such sealing means were damaged when the valve parts were assembled as it had to pass over the edges of the sharp retaining groove for the split type snap ring. Additional disadvantages occur when such a rotary valve assembly is used beneath ground as dirty ground water and/or abrasive materials had ingress past the split retaining ring into the area between the key member and its seat and into the area of the sealing ring. The sealing ring would be damaged when the valve was subsequently operated and oftentimes the key member would bind in its seat. While the above-mentioned disadvantages occur primarily in an "unbalanced" valve, they may also occur in a balanced valve or any non-pressure application where there are high thrust loads on the stem or key.

An object of the present invention is to provide an improved packing gland arrangement for a valve assembly or the like having means for preventing axial movement of the valve key or stem member relative to the housing member, the means also functioning as a secondary seal to prevent ingress of fluids and abrasive materials or the like from exteriorly of the housing member.

Still another object of the present invention is to provide an improved packing gland arrangement for a valve assembly or the like of the unbalanced or balanced type which prevents axial movement of the key or stem member relative to the housing member and, thus, permits the construction of an assembly wherein increased thrust loads can be applied to the key or stem member.

Ancillary to the immediately preceding object, it is a further object of the present invention to provide an arrangement to prevent axial movement of the key or stem member relative to the housing yet reduces the rotational friction between the key or stem member and the housing when the assembly is operated.

A still further object of the present invention is to provide an improved packing gland arrangement for valve assemblies or the like utilizing a thrust washer made from a low friction plastic material, the thrust washer being positively supported adjacent its inner and outer peripheries whereby thrust loads applied thereto by line or other pressure acting on the key or stem member cannot apply a cantiliver or binding movement to the thrust washer.

Still another object of the present invention is to provide a rotary valve assembly utilizing a thrust washer to retain the valve key member in the housing, the thrust washer further functioning to provide a secondary seal for the egress of fluid from within the housing when line pressure is applied thereto or line pressure is applied to the valve key, the thrust washer also providing a seal preventing the ingress of fluid and abrasive materials from the exterior of the valve assembly thereby preventing damage to the main valve seal.

These and other objects and advantages of the present invention will appear more fully in the following specification, claims, and drawings in which:

FIGURE 1 is a vertical sectional view with a portion of the valve key member being shown in elevation, the view illustrating the present invention applied to a rotary valve assembly whereby the valve body of the valve key member is a plug.

FIGURE 2 is a sectional view taken substantially on the line 2—2 of FIGURE 1, the valve assembly being shown in the open position.

FIGURE 3 is an enlarged fragmentary sectional view of the rotary valve assembly of FIGURE 1 illustrating in detail the present invention of retaining ring and thrust washer arrangement, the view also illustrating the deformation occuring when high thrust loads are applied by the valve key member on the thrust washer.

FIGURE 4 is an enlarged fragmentary view similar to FIGURE 3 but showing assignee's prior construction when a high thrust load on the valve key member due to internal pressure causes the thrust washer and retaining ring to start to fail.

FIGURE 5 illustrates in side elevation and end elevation the anti-friction thrust washer of the present invention.

FIGURE 6 illustrates a side elevational view and an end elevational view of the split retaining ring of the present invention; and FIGURE 7 is a fragmentary vertical sectional view of the packing gland arrangement of the present invention applied to a stem of a non-rising gate valve, fire hydrant or the like.

Referring now to the drawings wherein like character or reference numerals represent like or similar parts and in particular to FIGURES 1 and 2, there is shown a rotary valve assembly 10 having a housing member 12 provided with a flow passage 14 therethrough. The flow passage 14 has an inlet end 16 and an outlet end 18 which may be suitably threaded for receiving the threaded ends of fluid lines (not shown). The housing 12 is provided with a generally cylindrical extension 20 through which extends a key seat 22 open at its upper end to the exterior of the housing and at its inner end to the flow passage 14 intermediate of the inlet 16 and outlet 18. The key seat 22 in the particular environment disclosed may also represent a portion of the valve seat since the valve assembly 10 is illustrated with a valve body 24 of the plug type. Since the housing 12 is of the "closed-bottom" type, a sleeve like annular extension 26 is provided with a closed integral part 28. The sleeve like extension 26 provides a lower portion of the valve seat for the valve body 24.

The valve body 24 forms a part of a key valve member 30 having an upper trunnion portion 32 and a lower trunnion portion 34. The upper trunnion portion 32, as shown in FIGURE 1, extends through the key seat 22 and out of the cylindrical extension 20 and it may be provided at its upper end with a flattened non-circular head 36 for engagement by a wrench (not shown), or by hand, in order to turn the valve key member to open and close the valve assembly. The valve body 24, which as previously mentioned, is of the plug type, is fully disclosed in the common assignee's copending United States application Ser. No. 449,498, filed Apr. 28, 1965, by Frank H. Mueller and William L. Hauffe. For the purpose of this description it will be only necessary to say that the valve body member 24 is provided with a passage 40 therethrough which may be selectively aligned and disaligned with the inlet end 16 and outlet end 18 of the flow passage 14 through the housing member 12 to open and close respectively the valve assembly 10.

While the valve key member 30 is disclosed as having a valve body 24 of the "plug" type, it may also have a valve body of the "ball" type, such as disclosed in the common assignee's copending United States application Ser. No. 417,435, filed Dec. 10, 1964, by Frank H. Mueller, Wilbur R. Leopold, and John J. Smith.

Referring now to FIGURE 3, it will be noted that the key seat 22 in the cylindrical extension 20 of the valve housing member 12 is provided with an inclined outwardly diverging conical surface 42 and an enlarged cylindrical surface 46. The enlarged cylindrical surface 46 has an annular groove 48 therein which has its lower or inner side 50 at the upper or outer edge of the conical surface 42. The trunnion portion 32 of the valve key member 30 is provided with an upper reduced portion 52 defining an upwardly or outwardly facing shoulder 54. In more detail, the upwardly or outwardly facing shoulder 54 substantially lies in a plane through the inner or lower end of the conical surface 42 when the valve key member 30 is positioned in the housing 12 with its valve body 24 cooperating with the key or valve seat 22 (FIGURE 1).

Additionally, the upper reduced portion 52 of the trunnion portion 32 is provided with an annular or circumferential groove 56 having one side edge forming a continuation of the upwardly or outwardly facing shoulder 54.

A split anti-friction thrust washer 58 having an outer peripheral surface 60 which is conical in shape and corresponding to the conical surface 42 is arranged to have its inner peripheral portion 62 seated in the groove 46. The anti-friction thrust washer 58 is made from a low friction plastic material such as Celcon or nylon and, as best shown in FIGURE 5, is split on a bias to its radial sides as indicated at 64. When the anti-friction thrust washer 58 is installed on the reduced portion 52 of the trunnion portion 32 of key member 30, it is expanded over the reduced portion 52 and slipped into the groove 56. The valve key member 30 then can be installed in the housing 20 with the conical surface 60 of the washer 58 seating on the conical surface 42 of the key seat 22. The biased ends 64 will then overlap each other so that any pressure on the thrust washer in a direction parallel to its longitudinal axis will cause the biased ends to tightly seat on one another.

A split retaining or lock ring 66 is compressed and slipped through the cylindrical portion 46 of the key seat 22 and then released to fit into the groove 48. The split retaining or lock ring 66 overlies a portion of the anti-friction thrust washer 58 as shown in FIGURE 3 and, thus, when the valve assembly 10 is open and line pressure is acting against the bottom of the valve key member 30 tending to urge the same in the direction of the arrow A, the valve key member 30 is prevented from moving axially out of the key seat 22 by the retaining or lock ring 66. The spring retaining ring 66 has ends 70 which are cut on a bias to a radius of the split retaining ring as best shown in FIGURE 6. While the split retaining ring 66 is preferably made of bronze, it may also be made from a plastic material such as Celcon, or Delrin.

It will be noted by reference to FIGURES 5 and 6 that both the anti-friction thrust washer 58 and the retaining ring 66 are shown with a slight pitch in their relaxed position. It will be understood that when these elements are installed in the valve assembly as shown in FIGURES 1 and 3, there will be no pitch.

Referring now to FIGURE 4, there is disclosed the common assignee's improved but prior arrangement for retaining the valve key member 30' in the housing 12'. This arrangement is fully disclosed in the aforementioned co-pending application Ser. No. 449,498. While this arrangement has merit over prior known art where just a retaining ring by itself is used, it does not have the advantage of the present invention disclosed in FIGURE 3 especially when used with a valve assembly for extremely high pressure fluids. It will be noted in FIGURE 4 that when thrust is applied to the valve key member 30' in the direction of the arrow A' by internal line pressure, the thrust washer 58' will assume the position disclosed as there is a cantilever beam or bending action on the same. The inner edge of the thrust washer 58' will wedge against the outside diameter of the reduced portion 52' of the key member 30' as shown at B. This will make the turning of the key member 30' difficult and it will be fully appreciated that the amount of pressure needed to start the failure of the thrust washer 58' and the retainer ring 66 as well as the blow out pressure for complete failure will be less than that disclosed for the arrangement in FIGURE 3.

Referring back to FIGURE 3, it will now be understood that by supporting the inner periphery of the thrust washer 58 in the groove 56 as well as providing the retaining ring 66 overlapping an outer portion of the outer radial face of the thrust washer, the thrust washer 58 is effectively supported about its outer and inner periphery. Consequently, when exereme thrust loads are applied in the direction of A, the thrust washer 58 will only deform a slight bit, which as shown in the drawings for the purpose of disclosure has been exaggerated in FIGURE 3. The thrust washer 58 still has contact with the shoulder 54 at the points D and E. There will only be a slight deformation at the point F intermediate the points D and E.

The trunnion portion 32 of the valve key member 30 is provided with an annular groove 70 spaced below the outwardly facing shoulder 54. A suitable O-ring 72 seated in the groove 70 acts against the key seat 22 and prevents escape of fluid from within the valve outwardly of the same. By the construction described above with respect to the conical surface 42 and the groove 48, the O-ring 72 assembled on the valve key member 30 is not damaged when the key member is installed in the housing 12 as it can move past the tapered seat or conical surface 42 and thus will not engage any sharp edges for the groove 48.

As is usual in rotary valves, a top seal ring 80 made of an elastomeric material, such as rubber or the like, may be fitted into the area above the retaining ring 66. Also, the outer periphery of the cylindrical extension 20 may be threaded as indicated at 82 and this threaded end is known in the trade as a "Minneapolis top." In other words, the threads 82 are provided on the housing 12 when it is desired to use the valve assembly 10 with a curb box of the type having internal threads thereon, the curb box being threaded on the valve assembly when it is used as a curb stop.

Referring now to FIGURE 7, there is disclosed the packing gland arrangement of the present invention applied to a stem or key member 30" of a non-rising gate valve, fire hydrant, or the like. In more detail, the housing member 12″ is provided with a hollow interior 13″ and a stem or key seat generally indicated at 22″. Since in gate valves, hydrant valves or the like, the stem or key member 30″ is not necessarily provided with a trunnion at its lower end, the housing 12″ includes an annular inwardly extending flange 15″ for cooperating with a shoulder 17″ on the stem member 30″. This prevents the stem member 30″ from moving inwardly relative the housing member 12″. As in FIGURES 1 and 3, the packing gland arrangement of FIGURE 7 includes the provision of an inclined outwardly diverging conical surface 42″ and an enlarged cylindrical surface 46″. The stem member 30″ is provided with a reduced portion 52″ defining an outwardly facing shoulder 54″ lying substantially in a plane through the inner or lower end of the conical surface 42″. When the stem member 30″ is positioned in the seat 22″ with its shoulder 17″ engaging the annular flange 15″, the upper edge of the shoulder 17″ defined by the outwardly facing shoulder 54″ receives the lower surface of an anti-friction thrust washer 58″ having a conical surface 60″ complementary to the conical surface 42″. The anti-friction thrust washer 58″ is identical in construction to the washer 58 and has its inner periphery received in a groove 56″ immediately above the outwardly facing shoulder 54″ on the stem member 30″. A split retaining or lock ring 66″ carried in a groove 48″ in seat 22″ retains the thrust washer 58″ and the stem 30″ in the key seat 22″ so that the stem member 30″ cannot move outwardly relative to the housing member 12″. The lock ring 66″ is identical in construction to the lock ring 66. An O-ring seal 72″ carried in a groove on the stem member 30″ beneath the thrust washer 58″ may be provided if desired.

It will now be obvious that the arrangement disclosed in FIGURE 7 may be used wherever a packing gland is needed between a housing member and a stem member or shaft where the stem member or shaft is subject to either a high thrust load or where the interior of the housing member is subjected to high pressures.

The valve assembly heretofore described and illustrated in the drawings and in particular, the means for preventing axial movement of the valve key member relative to the valve housing fully and effectively accomplishes the objects and advantages of the invention. It will be realized, however, that the foregoing specific embodiments have been shown and described only for the purpose of illustrating the principles of this invention and are subject to some changes or modifications without departing from such principles. Therefore, the terminology used in the specification is for the purpose of description and not limitation, the spirit and scope of the invention being defined in the claims.

What is claimed is:

1. In a valve assembly or the like including a valve housing having a flow passage therethrough with ends defining an inlet and an outlet, said valve housing further having a generally cylindrical key seat with an opening at one end to the exterior of the housing and an opening at the other end to the interior of the housing, valve seat means in said housing, a key member carried in said key seat of said housing and including a trunnion portion, a valve body means operable by said key member for coacting with said valve seat means, the improvement in means to retain said key member against axial movement relative said housing and to provide a seal against ingress of fluid and/or abrasive material from without said housing comprising: an outwardly diverging conical surface in said key seat intermediate the key seat's opening to the exterior and interior of the housing; a reduced portion on the outer end of the trunnion portion of said key member defining an outwardly facing shoulder substantially lying in a plane through the inner end of said conical surface; an annular anti-friction thrust washer having a peripheral conical edge corresponding to and seating against said conical surface of said key seat; and means engaging said washer on its outer radial surface at spaced points adjacent the outer periphery of the same and the inner periphery of the same.

2. The valve assembly as claimed in claim 1 in which said means engaging said washer on its outer radial surface at spaced points includes an annular groove in said key seat at the outer end of said conical surface, a snap ring positioned in said annular groove and overlapping a portion of the outer radial surface of said washer, and an annular groove on the reduced portion of said trunnion portion of said valve key member for receiving the inner peripheral portion of said washer.

3. The valve assembly as claimed in claim 2 in which said anti-friction thrust washer is split substantially radially of the same.

4. The valve assembly as claimed in claim 2 in which said anti-friction thrust washer is split substantially radially of the same on a bias to its radial surfaces.

5. The plug valve as claimed in claim 2 in which said anti-friction washer is made of a low friction plastic material.

6. The rotary valve assembly as claimed in claim 5 in which said low friction plastic material is Celcon.

7. The valve assembly as claimed in claim 5 in which said low friction plastic material is nylon.

8. The valve assembly as claimed in claim 2 including an O-ring positioned between said key seat and said valve key member intermediate the opening of said key seat to the interior of the housing and said anti-friction thrust washer.

9. The rotary valve assembly as claimed in claim 8 in which said key member includes an annular groove for supporting said O-ring.

10. In a rotary valve assembly of the type including a valve housing having a flow passage therethrough with ends defining an inlet and an outlet, said valve housing further having a generally cylindrical key seat with an opening at one end to the exterior of the housing and an opening at the other end to the flow passage intermediate of its inlet and outlet, valve seat means in said housing, a rotatable valve key member insertable into and through said key seat and supported by said housing for rotary movement, said valve key member including valve body means at one end thereof for coacting with said valve seat means and a trunnion portion extending through said key seat for rotating the valve means, the improvement in means to retain said valve key member against axial movement relative said housing due to line pressure within said housing and to provide a secondary seal against ingress of fluid and/or abrasive material from without said housing comprising: an outwardly diverging conical surface in said key seat intermediate the key seat's opening to the exterior of the housing and to the flow passage; an annular groove in said key seat at the outer end of said conical surface; a reduced portion on the outer end of the trunnion portion of said valve key member defining an outwardly facing shoulder substantially lying in a plane through the inner end of said conical surface; a circumferential groove on said reduced portion of said trunnion portion of said valve key member, said groove having its lower side wall providing a continuation of said outwardly facing shoulder; a split annular anti-friction thrust washer having an outer peripheral conical edge complementary to and seating against said conical surface of said key seat, said thrust washer having its inner radial surface abutting said outwardly facing shoulder and its inner peripheral edge seated in the annular groove on said reduced portion; and a snap ring positioned in said annular groove on said key seat and overlapping a portion of the outer radial surface of said washer, said snap ring having its inner peripheral surface spaced from the reduced portion of the trunnion portion of said valve key.

11. The rotary valve assembly as claimed in claim 10 including sealing means between said trunnion portion of said valve key member and said key seat, said sealing means including a circumferential groove on said trunnion portion inwardly of said outwardly facing shoulder, and an O-ring carried in said groove.

12. The valve assembly as claimed in claim 11 in which said thrust washer is made of Celcon.

13. The valve assembly as claimed in claim 11 in which said thrust washer is split on a bias to its radial inner and outer surfaces.

14. A packing gland arrangement between a housing and a stem member extending through a seat in the housing comprising: an outwardly diverging conical surface in said seat; a reduced portion on the outer end of said stem member defining an outwardly facing shoulder substantially lying in a plane through the inner end of said conical surface; a groove on said reduced portion of said stem member, said groove having its lower side wall providing a continuation of said outwardly facing shoulder; a split annular antifriction thrust washer having an outer peripheral conical edge complementary to and seating against said conical surface of said seat, said thrust washer having its inner radial surface abutting said outwardly facing shoulder and its peripheral edge seated in the annular groove on said reduced portion; an annular groove in said seat at the outer end of said conical surface; and a snap ring positioned in said annular groove on said key seat and overlapping a portion of the outer radial surface of said washer, said snap ring having its inner peripheral surface spaced from the reduced portion of said stem member.

15. The packing gland arrangement of claim 14 including a circumferential groove on said stem member inwardly of said outwardly facing shoulder, and an O-ring carried in said groove for providing a seal between said stem member and said seat.

No references cited.

M. CARY NELSON, *Primary Examiner.*

J. DWELLE, *Assistant Examiner.*